US010062109B1

(12) United States Patent
Poursartip et al.

(10) Patent No.: US 10,062,109 B1
(45) Date of Patent: *Aug. 28, 2018

(54) SYSTEMS AND METHODS FOR FINANCING MERCHANT BUSINESS NEEDS

(71) Applicant: SQUARE, INC., San Francisco, CA (US)

(72) Inventors: Ariana Poursartip, San Francisco, CA (US); John Bryan Scott, San Francisco, CA (US); Kevin Teh, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,591

(22) Filed: Oct. 5, 2017

Related U.S. Application Data

(63) Continuation of application No. 14/491,963, filed on Sep. 19, 2014, now Pat. No. 9,786,005.

(60) Provisional application No. 62/002,999, filed on May 26, 2014.

(51) Int. Cl.
*G06Q 40/02* (2012.01)
*G06Q 10/06* (2012.01)

(52) U.S. Cl.
CPC ..... *G06Q 40/025* (2013.01); *G06Q 10/06315* (2013.01)

(58) Field of Classification Search
None
See application file for complete search history.

(56) References Cited

U.S. PATENT DOCUMENTS

| 5,963,919 | A | 10/1999 | Brinkley et al. |
| 6,167,385 | A | 12/2000 | Hartley-Urquhart |
| 6,941,281 | B1 | 9/2005 | Johnson |
| 6,996,538 | B2 | 2/2006 | Lucas |
| 7,103,570 | B1 | 9/2006 | Morea et al. |

(Continued)

FOREIGN PATENT DOCUMENTS

| CA | 2 838 406 A1 | 4/2015 |
| WO | 99/03076 A1 | 1/1999 |
| WO | 2012/150985 A1 | 11/2012 |

OTHER PUBLICATIONS

Allistar Barr / Reuters, Update 5—Amazon offering loans to its online sellers, Sep. 27, 2012 (Year: 2012).*

(Continued)

*Primary Examiner* — Matthew S Gart
*Assistant Examiner* — Akosua Kyereme-Tuah
(74) *Attorney, Agent, or Firm* — Mattingly & Malur, PC

(57) ABSTRACT

A payment system can determine when a business need for a merchant is expected to occur. The payment system can also determine whether the merchant is eligible for financing for a financing amount. Once a determination is made that the merchant is eligible for the financing, the payment system can send the merchant a notification describing the expected business need along with an offer for the financing, which may be presented in an interface on a merchant device. The merchant can accept the offer for the financing by sending an acceptance to the payment system. Upon accepting the offer, the merchant is provided the financing amount, for example, in the form of an electronic deposit in a financial account of the merchant.

20 Claims, 5 Drawing Sheets

(56) References Cited

U.S. PATENT DOCUMENTS

| | | | |
|---|---|---|---|
| 7,181,427 B1 | 2/2007 | DeFrancesco et al. | |
| 7,353,203 B1 | 4/2008 | Kriplani et al. | |
| 7,797,231 B1 | 9/2010 | Loeb et al. | |
| 7,953,653 B2 | 5/2011 | Siggers et al. | |
| 8,239,227 B2 | 8/2012 | Megiddo et al. | |
| 8,666,847 B1* | 3/2014 | Blank | G06Q 10/04 705/28 |
| 8,732,040 B1 | 5/2014 | Prabhune et al. | |
| 8,799,133 B2 | 8/2014 | Gula, IV | |
| 9,519,892 B2 | 12/2016 | Martell et al. | |
| 9,727,912 B1 | 8/2017 | Poursartip et al. | |
| 9,773,242 B1 | 9/2017 | Boates et al. | |
| 9,779,432 B1 | 10/2017 | Shearer | |
| 9,786,005 B1 | 10/2017 | Poursartip et al. | |
| 9,824,394 B1 | 11/2017 | Boates et al. | |
| 9,830,651 B1 | 11/2017 | Brock | |
| 9,836,786 B1 | 12/2017 | Baker | |
| 9,892,458 B1 | 2/2018 | Shearer et al. | |
| 2002/0038277 A1 | 3/2002 | Yuan | |
| 2002/0174061 A1 | 11/2002 | Srinivasan et al. | |
| 2003/0101107 A1 | 5/2003 | Agarwal et al. | |
| 2004/0054625 A1 | 3/2004 | Kellogg et al. | |
| 2004/0064398 A1 | 4/2004 | Browne et al. | |
| 2004/0193540 A1 | 9/2004 | Brown et al. | |
| 2006/0095350 A1 | 5/2006 | Hall et al. | |
| 2007/0117601 A1 | 5/2007 | Van Luchene | |
| 2007/0156579 A1 | 7/2007 | Manesh | |
| 2007/0156584 A1 | 7/2007 | Barnes et al. | |
| 2007/0174191 A1 | 7/2007 | Keaton et al. | |
| 2007/0255635 A1 | 11/2007 | Multer et al. | |
| 2007/0255653 A1 | 11/2007 | Tumminaro et al. | |
| 2008/0033825 A1 | 2/2008 | Goldin | |
| 2008/0052229 A1 | 2/2008 | Sheinker et al. | |
| 2008/0109348 A1 | 5/2008 | Saxena et al. | |
| 2008/0154769 A1 | 6/2008 | Anderson et al. | |
| 2008/0195534 A1 | 8/2008 | Landis et al. | |
| 2009/0043697 A1 | 2/2009 | Jacobs et al. | |
| 2010/0032308 A1 | 2/2010 | Qi et al. | |
| 2010/0223154 A1 | 9/2010 | Frohwein et al. | |
| 2010/0228651 A1 | 9/2010 | Becerra et al. | |
| 2010/0268667 A1 | 10/2010 | King et al. | |
| 2010/0299251 A1 | 11/2010 | Thomas | |
| 2010/0306071 A1 | 12/2010 | Kay | |
| 2011/0055056 A1 | 3/2011 | Kwatinetz | |
| 2011/0202445 A1 | 8/2011 | Torres | |
| 2011/0251870 A1 | 10/2011 | Tavares et al. | |
| 2012/0011071 A1 | 1/2012 | Pennock et al. | |
| 2012/0022945 A1 | 1/2012 | Falkenborg et al. | |
| 2012/0054097 A1* | 3/2012 | Frohwein | G06Q 20/102 705/40 |
| 2012/0066033 A1 | 3/2012 | Frohwein et al. | |
| 2012/0089436 A1 | 4/2012 | Tavares et al. | |
| 2012/0143649 A1 | 6/2012 | Aubertin | |
| 2012/0191525 A1 | 7/2012 | Singh et al. | |
| 2012/0209734 A1 | 8/2012 | Brooks et al. | |
| 2012/0226595 A1 | 9/2012 | Torres | |
| 2012/0233010 A1* | 9/2012 | Frohwein | G06Q 20/10 705/26.3 |
| 2012/0233090 A1 | 9/2012 | Tavares et al. | |
| 2012/0239552 A1 | 9/2012 | Harycki | |
| 2012/0271765 A1 | 10/2012 | Cervenka et al. | |
| 2013/0054484 A1 | 2/2013 | Hoeflinger et al. | |
| 2013/0085804 A1* | 4/2013 | Leff | G06Q 30/0219 705/7.29 |
| 2013/0124432 A1 | 5/2013 | Thibodeau | |
| 2013/0138544 A1 | 5/2013 | Chapman | |
| 2013/0185228 A1 | 7/2013 | Dresner | |
| 2013/0204664 A1 | 8/2013 | Romagnolo et al. | |
| 2013/0211892 A1 | 8/2013 | Frohwein et al. | |
| 2013/0226688 A1 | 8/2013 | Harvilicz et al. | |
| 2013/0268417 A1 | 10/2013 | Sgueglia | |
| 2013/0332265 A1 | 12/2013 | Sossaman, II et al. | |
| 2014/0006202 A1 | 1/2014 | Frohwein et al. | |
| 2014/0025473 A1 | 1/2014 | Cohen | |
| 2014/0025525 A1 | 1/2014 | Frohwein et al. | |
| 2014/0032298 A1 | 1/2014 | Corrie et al. | |
| 2014/0032307 A1 | 1/2014 | Corrie et al. | |
| 2014/0032308 A1 | 1/2014 | Corrie et al. | |
| 2014/0032309 A1 | 1/2014 | Corrie et al. | |
| 2014/0032310 A1 | 1/2014 | Corrie et al. | |
| 2014/0040157 A1 | 2/2014 | Cohen et al. | |
| 2014/0052668 A1 | 2/2014 | Cameron et al. | |
| 2014/0058804 A1 | 2/2014 | Zhou et al. | |
| 2014/0067677 A1 | 3/2014 | Ali et al. | |
| 2014/0143120 A1 | 5/2014 | Clarke et al. | |
| 2014/0143124 A1 | 5/2014 | Sanders | |
| 2014/0143405 A1* | 5/2014 | Pavlidis | G06Q 30/0202 709/224 |
| 2014/0164049 A1 | 6/2014 | Yakos et al. | |
| 2014/0171039 A1 | 6/2014 | Bjontegard | |
| 2014/0207550 A1 | 7/2014 | Eden et al. | |
| 2014/0229397 A1 | 8/2014 | Fink | |
| 2014/0244361 A1* | 8/2014 | Zhang | G06Q 30/0204 705/7.33 |
| 2014/0244486 A1 | 8/2014 | Abril | |
| 2014/0279682 A1 | 9/2014 | Feldman | |
| 2014/0304137 A1 | 10/2014 | Olson et al. | |
| 2014/0316823 A1 | 10/2014 | Cooper | |
| 2014/0344037 A1 | 11/2014 | Dunbar et al. | |
| 2014/0351116 A1 | 11/2014 | Hoff | |
| 2014/0358766 A1 | 12/2014 | Nayyar et al. | |
| 2015/0026035 A1 | 1/2015 | Showalter | |
| 2015/0039490 A1 | 2/2015 | Forrester et al. | |
| 2015/0100475 A1 | 4/2015 | Cummings et al. | |
| 2015/0149333 A1 | 5/2015 | Yaplee et al. | |
| 2015/0161606 A1* | 6/2015 | Lee | G06Q 20/405 705/44 |
| 2015/0170286 A1 | 6/2015 | Gingell et al. | |
| 2015/0206164 A1 | 7/2015 | Espana et al. | |
| 2015/0332414 A1 | 11/2015 | Unser et al. | |
| 2016/0180328 A1 | 6/2016 | Loomis | |
| 2016/0210634 A1 | 7/2016 | Trujillo | |

OTHER PUBLICATIONS

Oracle, Oracle retail advanced inventory planning, 2013 (Year: 2013).*

Non-Final Office Action dated Mar. 8, 2018, for U.S. Appl. No. 15/814,366, of Kim, A., et al., filed Nov. 15, 2017.

"Oracle Retail Advanced Inventory Planning," www.oracle.com, pp. 1-2 (2013).

Agrawal, A., et al., "Some Simple Economics of Crowdfunding," University of Toronto, dated Jun. 1, 2013, pp. 1-46.

Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.

Giusti, A.C., "Want More Revenue? Enhance the Offers: Carefully matching merchants with the right products and insuring agents know them well can dictate how much an ISO may earn from value-added services," ISO & Agent 7.4, dated May 1, 2011, pp. 2.

Leung, L., "PayPal ramps up small-business loans," The Orange County register, Journal—Gazette [Ft. Wayne, Ind], dated Feb. 10, 2014, pp. 2.

Steinberg, S., and Demaria, R., "The Crowdfunding Bible: How to raise money for any startup, video game or project," read.me, dated 2012, pp. 1-47.

Non-Final Office Action dated Jan. 8, 2015, for U.S. Appl. No. 14/491,958, of Poursartip, A., et al., filed Sep. 19, 2014.

Non-Final Office Action dated Mar. 27, 2015, for U.S. Appl. No. 14/491,965, of Poursartip, A., et al., filed Sep. 19, 2014.

Non-Final Office Action dated Mar. 27, 2015, for U.S. Appl. No. 14/491,967, of Poursartip, A., et al., filed Sep. 19, 2014.

Non-Final Office Action dated May 20, 2015, for U.S. Appl. No. 14/491,958, of Poursartip, A., et al., filed Sep. 19, 2014.

Advisory Action dated Jul. 27, 2015, for U.S. Appl. No. 14/491,958, of Poursartip, A., et al., filed Sep. 19, 2014.

Non-Final Office Action dated Aug. 27, 2015, for U.S. Appl. No. 14/675,127, of Shearer, D.J., et al., filed Mar. 31, 2015

(56) References Cited

OTHER PUBLICATIONS

Non-Final Office Action dated Aug. 27, 2015, for U.S. Appl. No. 14/540,947, of Baker, G. K, et al., filed Nov. 13, 2014.
Non-Final Office Action dated Oct. 8, 2015, for U.S. Appl. No. 14/167,931, of Brock, Z., et al., filed Jan. 29, 2014.
Final Office Action dated Oct. 8, 2015, for U.S. Appl. No. 14/491,967, of Poursartip, A., et al., filed Sep. 19, 2014.
Final Office Action dated Nov. 6, 2015, for U.S. Appl. No. 14/491,965, of Poursartip, A., et al., filed Sep. 19, 2014.
Non-Final Office Action dated Jan. 5, 2016, for U.S. Appl. No. 14/491,958, of Poursartip, A., et al., filed Sep. 19, 2014.
Non-Final Office Action dated Jan. 13, 2016, for U.S. Appl. No. 14/663,209, of Boates, B., et al., filed Mar. 19, 2015.
Non-Final Office Action dated Jan. 21, 2016, for U.S. Appl. No. 14/675,257, of Shearer, D. J., et al., filed Mar. 19, 2015.
Non-Final Office Action dated Feb. 12, 2016, for U.S. Appl. No. 14/540,947, of Baker, G. K., et al., filed Nov. 13, 2014.
Final Office Action dated Mar. 31, 2016, for U.S. Appl. No. 14/675,127, of Shearer, D. J., et al., filed Mar. 31, 2015.
Non-Final Office Action dated Apr. 27, 2016, for U.S. Appl. No. 14/616,515, of Boates, B., et al., filed Feb. 6, 2015.
Non-Final Office Action dated May 5, 2016, for U.S. Appl. No. 14/491,967, of Poursartip, A., et al., filed Sep. 19, 2014.
Final Office Action dated May 12, 2016, for U.S. Appl. No. 14/167,931, of Brock, Z., et al., filed Jan. 29, 2014.
Non-Final Office Action dated Jun. 17, 2016, for U.S. Appl. No. 14/491,965, of Poursartip, A., et al., filed Sep. 19, 2014.
Non-Final Office Action dated Jun. 17, 2016, for U.S. Appl. No. 14/622,605, of Scott, J.B., et al., filed Feb. 13, 2015.
Final Office Action dated Aug. 3, 2016, for U.S. Appl. No. 14/663,209, of Boates, B., et al., filed Mar. 19, 2015.
Non-Final Office Action dated Sep. 9, 2016, for U.S. Appl. No. 14/540,947, of Baker, G. K., filed Nov. 13, 2014.
Final Office Action dated Oct. 7, 2016, for U.S. Appl. No. 14/675,257, of Shearer, D. J., et al., filed Mar. 31, 2015.
Final Office Action dated Oct. 21, 2016, for U.S. Appl. No. 14/491,967, of Poursartip, A., et al., filed Sep. 19, 2014.
Non-Final Office Action dated Nov. 3, 2016, for U.S. Appl. No. 14/675,127, of Shearer, D.J., et al.,filed Mar. 31, 2015.
Non-Final Office Action dated Nov. 28, 2016, for U.S. Appl. No. 14/491,963, of Poursartip, A., et al, filed Sep. 19, 2014.
Non-Final Office Action dated Dec. 19, 2016, for U.S. Appl. No. 14/491,965, of Poursartip, A., et al., filed Sep. 19, 2014.
Non-Final Office Action dated Jan. 11, 2017, for U.S. Appl. No. 14/167,931, of Brock, Z., filed Jan. 29, 2014.
Examiner's Answer to Appeal Brief dated Jan. 27, 2017, for U.S. Appl. No. 14/491,958, of Poursartip, A., et al., filed Sep. 19, 2014.
Non-Final Office Action date Feb. 10, 2017, for U.S. Appl. No. 14/622,605, of Scott, J.B., et al., Filed Feb. 13, 2015.
Final Rejection dated Feb. 17, 2017, for U.S. Appl. No. 14/616,515, of Boates, B., et al., filed Feb. 6, 2015.
Non-Final Office Action dated Mar. 1, 2017, for U.S. Appl. No. 14/616,520, of Boates, B., et al., filed Feb. 6, 2015.
Notice of Allowance dated Mar. 30, 2017, for U.S. Appl. No. 14/491,967, of Poursartip, A., et al., filed Sep. 19, 2014.
Final Office Action dated Apr. 6, 2017, for U.S. Appl. No. 14/540,947, of Baker, G.K., filed Nov. 13, 2014.
Final Office Action dated Apr. 10, 2017, for U.S. Appl. No. 14/675,127, of Shearer, D.J., et al., filed Mar. 31, 2015.
Non-Final Office Action dated May 10, 2017, for U.S. Appl. No. 14/602,486, of Fern, A.J., et al., filed Jan. 22, 2015.
Non-Final Office Action dated May 16, 2017, for U.S. Appl. No. 14/676,678, of Scott, J.B., et al., filed Apr. 1, 2015.
Notice of Allowance dated May 25, 2017, for U.S. Appl. No. 14/663,209, of Boates, B., et al., filed Mar 19, 2015.
Notice of Allowance dated May 31, 2017, for U.S. Appl. No. 14/675,257, of Shearer, D.J., et al., filed Mar. 31, 2015.
Notice of Allowance dated Jun. 7, 2017, for U.S. Appl. No. 14/491,963, of Poursartip, A., et al., filed Sep. 19, 2014.
Notice of Allowance dated Jun. 22, 2017, for U.S. Appl. No. 14/540,947, of Baker, G.K., filed Nov. 13, 2014.
Notice of Allowance dated Jul. 24, 2017, for U.S. Appl. No. 14/616,515, of Boates, B., et al., filed Feb. 6, 2015.
Notice of Allowance dated Jul. 25, 2017, for U.S. Appl. No. 14/167,931, of Brock, Z., filed Jan. 29, 2014.
Final Office Action dated Jul. 27, 2017, for U.S. Appl. No. 14/491,965, of Poursartip, A., et al., filed Sep. 19, 2014.
Final Office Action dated Dec. 29, 2017, for U.S. Appl. No. 14/676,678, of Scott, J.B., et al., filed Apr. 1, 2015.
Final Office Action dated Jan. 9, 2018, for U.S. Appl. 14/602,486, of Fern, A.J., et al., filed Jan. 22, 2015.
Notice of Allowance dated Jan. 19, 2018, for U.S. Appl. No. 14/491,965, of Poursartip, A., et al., filed Sep. 19, 2014.
Final Office Action dated Sep. 13, 2017, for U.S. Appl. No. 14/616,520, of Boates, B., et al., filed Feb. 6, 2015.
Notice of Allowance dated Sep. 20, 2017, for U.S. Appl. No. 14/675,127, of Shearer, D.J., et al., filed Mar. 31, 2015.
Notice of Allowance dated Sep. 22, 2017, for U.S. Appl. No. 14/622,605, of Scott, J. B., et al., filed Feb. 13, 2015.
Comptroller's Handbook, "Accounts Receivable and Inventory Financing," Comptroller of the Currency Administrator of National Banks, published Mar. 2000, pp. 1-78.
Non-Final Office Action dated Mar. 8, 2018, for U.S. Appl. No. 14/522,287, of Cieri, M.M, et al., filed Oct. 23, 2014.

* cited by examiner

200

204

Merchant #843 Inventory Data

| Item | Name | Remaining Quantity |
|---|---|---|
| Item #515 | Blue t-shirt | 52 |
| Item #516 | Red t-shirt | 55 |
| Item #517 | Team Cap | 33 |
| Item #518 | Team t-shirt | 77 |

206

Merchant #843 Sales Data

| Item | Name | Jan '14 Sales | | Feb '14 Sales | | ... |
|---|---|---|---|---|---|---|
| Item #515 | Blue t-shirt | 44 | $531 | 75 | $833 | |
| Item #516 | Red t-shirt | 63 | $634 | 55 | $521 | |
| Item #517 | Team Cap | 73 | $253 | 56 | $126 | |
| Item #518 | Team t-shirt | 11 | $165 | 8 | $103 | |

202

Merchant Inventory Data

FIG. 2

SYSTEMS AND METHODS FOR FINANCING MERCHANT BUSINESS NEEDS

CROSS-REFERENCE TO RELATED APPLICATIONS

This application is a continuation of, and claims priority to, U.S. patent application Ser. No. 14/491,963, filed on Sep. 19, 2014, issued as U.S. Pat. No. 9,786,005, which claims the benefit of U.S. Provisional Patent Application No. 62/002,999, filed on May 26, 2014, and which are incorporated by reference herein in their entireties.

BACKGROUND

Individuals and businesses can use inventory management systems to manage their merchandise. These inventory management systems track incoming items, outgoing items, and transfers of items between different storage locations. This information can be used by businesses to keep track of their merchandise and make decisions for when certain items should be restocked.

BRIEF DESCRIPTION OF THE DRAWINGS

In order to describe the manner in which features of the disclosure can be obtained, a more particular description of the principles will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example view of data that can be used to provide merchants with inventory recommendations;

DETAILED DESCRIPTION

Figure 1:
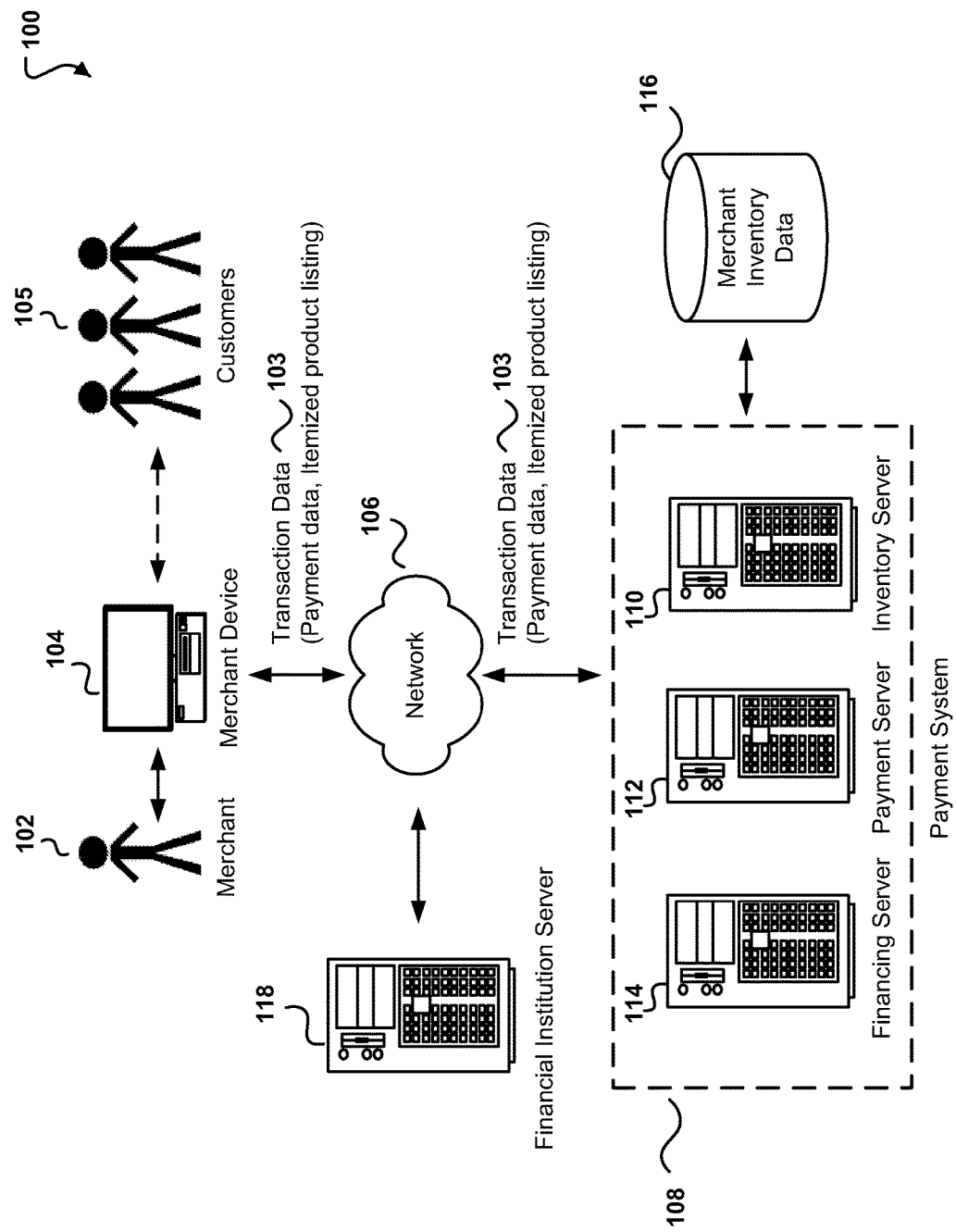
FIG. 1 illustrates an example of an environment for implementing a payment system that is able to manage merchant inventories.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Systems and methods in accordance with various embodiments of the present disclosure overcome one or more of the above-referenced and other deficiencies in conventional approaches to managing inventories for merchants through a payment system that the merchants also use to process financial transactions. In particular, various embodiments of the present disclosure can provide a method for managing a merchant's inventory by tracking the merchant's financial transactions through the payment system. For example, each financial transaction processed by the merchant can provide the payment system with information about items that were sold and their respective quantities. The payment system can be configured to keep track of the merchant's inventory, for example, by adjusting item quantities that are available in the merchant's inventory based on quantities of items that were sold in the financial transactions. If items in the merchant's inventory need to be replenished, the payment system can make recommendations to the merchant accordingly.

Along with this recommendation, the payment system can provide the merchant with one or more offers of cash advances. Whether a merchant qualifies for a financing offer can be based entirely on an evaluation of the merchant's previously conducted financial transactions through the payment system. For example, a determination can be made to offer the merchant a cash advance of $8,000 and an $800 fee for the cash advance being offered. Thus, the merchant would receive a cash advance of $8,000 and would have to pay back the merchant financing system, e.g., the payment system, a total amount of $8,800, i.e., the $8,000 cash advance and the $800 fee. This amount can be collected by the payment system as a fraction of the amounts collected by the merchant from future financial transactions that are conducted through the payment system. To accept the offer, the merchant can select an option, for example, through a financing interface provided by the payment system. Once the offer is accepted, the merchant can be provided the cash advance through an electronic deposit made by the payment system in a financial account of the merchant in a financial institution.

After the cash advance is disbursed, each time the merchant conducts a financial transaction through the payment system, the payment system will deduct a specified percentage, e.g., 10 percent, from the amount charged in the financial transaction. For example, if the merchant conducts a financial transaction in the amount of $50.00, then, while processing the financial transaction, the payment system will automatically deduct $5.00, and apply that amount to the amount owed by the merchant, i.e., $8,800. In other words, at a rate of 10 percent, the merchant will be done repaying the amount owed once the merchant has reached $88,000 in financial transactions conducted through the payment system. In some embodiments, the payment system can be configured to deduct the rate of repayment, e.g., 10 percent, from a group of financial transactions conducted by the merchant through the payment system over a particular period of time, e.g., daily, weekly, bi-weekly, monthly, or yearly.

The approaches described in this specification can allow merchants to easily manage their inventories and the restocking of items in those inventories. Merchants that do not have adequate funds can also obtain financing for replenishing their inventories without having to go through a typical loan application process. Other advantages, variations, and functions are described and suggested below as may be provided in accordance with the various embodiments.

FIG. 1 illustrates an example of an environment 100 for implementing a payment system 108 that is able to manage merchant inventories. The exemplary environment 100 includes a payment system 108. The payment system 108 includes an inventory server 110, a payment server 112, and a financing server 114.

Each of the inventory server 110, the payment server 112, and the financing server 114, can be implemented as computer programs on one or more computers in one or more locations, in which the systems, components, and techniques described in this specification can be implemented. The payment server 112 is configured to process financial transactions between the merchant 102 and its customers 105. These financial transactions can be, for example, card-less payment transactions or transactions performed using financial payment instruments, e.g., credit cards, debit cards, or gift cards, to name some examples. Further operation of the payment system 112 is described below in reference to FIG. 5. The example environment 100 also includes a merchant computing device 104 that can be used to conduct financial transactions, e.g., the merchant device 505, as described below in reference to FIG. 5.

The merchant device 104 can be a computer coupled to the payment system 108 through a data communication network 106, e.g., the Internet. The network 106 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The merchant device 104 and the payment system 108 can communicate over the network 106 using wired or wireless connections, and combinations thereof.

A customer 105 can collect, or request, items that are available for purchase from the merchant 102. When the customer 105 is ready to enter into a financial transaction, the customer 105 can, for example, approach a point-of-sale for the merchant 102. The merchant 102 can then interact with a merchant application running on the merchant device 104 to initiate a payment transaction for the items being purchased by the customer 105. For example, the merchant 102 using the merchant application can determine a total amount to bill the customer 105 for the items being purchased. The customer 105 can provide a financial payment card or enter into a card-less payment transaction to pay for the amount due.

The merchant 102 can submit a request for a financial payment transaction for the total amount to the payment system 108. When submitting the request, the merchant device 104 typically sends, to the payment system 108, data describing the customer's financial payment data 103, e.g., credit card information, along with data describing an itemized listing of products that are being purchased by the customer 105 including, for example, the items being purchased, respective costs, and respective quantities being purchased. The payment system 108 can use the financial payment data 103 to process the financial payment transaction for the total amount to be billed to the customer 105.

In some embodiments, the inventory server 110 is configured to manage the merchant's product inventory. For example, the inventory server 110 can maintain the merchant's inventory in a database 116, as shown in the example view of a merchant inventory database 202 in FIG. 2 The merchant inventory database 202 can store inventory data 204 that includes a listing of items that are available for purchase from the merchant, their respective item names and/or descriptions, and respective quantities of the items that are remaining in the merchant's inventory. The inventory server 110 can track the merchant's inventory based in part on the transaction data 103 that is received from the merchant device 104. For example, when the transaction data 103 is received, the payment system can evaluate the listing of items being purchased by the customer 105 and the quantities in which these items are being purchased. The inventory server 110 can then update the merchant inventory database 202 to reduce the respective amounts of quantities of the items being purchased by the customer 105. The inventory server 110 can track quantities remaining based on the actual number of items remaining in the merchant's inventory or on a remaining percentage of the quantity the merchant normally has in stock of the item, e.g., "quantity of item #44 is down to 5% of the quantity you normally have of this item."

In some embodiments, the inventory server 110 is also configured to manage the merchant's sales data. For example, the inventory server 110 can maintain the merchant's sales data in the database 116, as shown in the example view of the merchant inventory database 202 in FIG. 2. The merchant inventory database 202 can store sales data 206 that includes a listing of items that are available for purchase from the merchant, their respective item names and/or descriptions, respective quantities of the items that were purchased by the merchant's customers 105, and respective amounts that were generated from the sales. Thus, for any given time period, e.g., day, week, month, quarter, and year, the inventory server 110 can keep track of the items that were purchased by the merchant's customers 105 during that time period and the respective quantities of these purchased items. The inventory server 110 can track the merchant's sales based in part on the transaction data 103 that is received from the merchant device 104, as described above.

The inventory server 110 can apply generally known approaches to predictive modeling to the merchant's inventory data 204 and sales data 206 to make inventory-based recommendations to the merchant, e.g., send the merchant notifications when an inventory shortage is predicted. For example, predictive modeling can be used to predict when the merchant will run out of a particular item. Inventory shortages can be determined in various ways based on the embodiment.

For example, in some embodiments, inventory recommendations are predicted based in part on the merchant's inventory data. That is, the inventory server 110 can evaluate respective quantities of items currently in stock at the merchant to determine whether particular items need to be restocked. For example, a particular item may need to be re-stocked because its in-stock quantity is below a threshold quantity.

In some embodiments, inventory recommendations are predicted based in part on the merchant's sales data. For example, the inventory server 110 can determine, based on the merchant's past sales data for an item, that the merchant sold a certain quantity of the particular item during a time period, e.g., day, week, month, quarter, or year. Based on this information, the inventory server 110 can provide the merchant with a notification when an item should be replenished and the amount in which the item should be replenished. For example, the inventory system 110 can notify the merchant that the merchant should have 60,000 units of a particular item in stock for July since the merchant sold 60,000 units of the particular item two years ago in the month of July and sold 60,000 units of the same particular item last year in the month of July.

In some embodiments, inventory recommendations are based in part on the merchant's current inventory and in part on the merchant's sales data. That is, based on the merchant's current inventory of a particular item and on historical sales of the particular item by the merchant, the inventory server 110 can notify the merchant to replenish the particular item at appropriate times. For example, if the inventory server 110 determines that the merchant has 50 units of a particular item in stock for the month of November and, based on past sales, the merchant typically sells 250 units of the particular item during the month of November, then the inventory server 110 can notify the merchant to purchase 200 units of the particular item. Using the merchant's inventory data and sales data, the inventory server 110 can also provide the merchant with other types of inventory information. For example, based on historical sales of an item and on the current stock of the item, the inventory server 110 can notify the merchant that the item is going to run out within a certain time period, for example, within 10 days.

In addition to the merchant's current inventory data and the merchant's sales data, the inventory server 110 can be configured to supplement recommendations based on data obtained from social media. For example, the inventory server 110 can be configured to utilize Application Programming Interfaces (APIs) to obtain, from social media resources, data describing a number of check-ins at the merchant's location, number of reviews for the merchant, an average rating for the merchant, a number of entities that have identified the merchant as a favorite, to name some examples. This information can be used to determine when the merchant is gaining popularity and, as a result, predict that the merchant will be receiving more customers. This information can then be combined with other sources of information, for example, inventory data and sales data, to provide the merchant with recommendations for replenishing the merchant's inventory.

In some embodiments, the inventory server 110 can also evaluate lead times associated with replenishing product inventory to make recommendations for when the merchant should replenish the item. For example, the inventory server 110 can determine that delivery of the item takes, on average, five business days. Based on this determination, the inventory server 110 can notify the merchant when it is time to re-order the item so that it arrives before the merchant's current stock of the item is predicted to be sold out.

In some embodiments, the inventory server 110 is configured to categorize the merchant into a merchant category that identifies the type of business being run by the merchant, for example, using merchant category codes (MCC). The inventory server 110 can use this merchant categorization to make recommendations for when the merchant should replenish items. For example, the recommendations can be made based in part on weather forecasts, e.g., recommend stocking up on umbrellas for a predicted rainy season, yearly seasons, e.g., recommend stocking up winter clothes, holidays, and industry trends, e.g., based on some industry index. The inventory server 110 can also identify opportunities to purchase items at discounted rates, for example, based on a determination that particular vendors are offering items at a discount or by notifying the merchant of off-peak time periods for stocking up on particular items.

In some embodiments, the inventory server 110 is configured to provide recommendations by comparing the merchant's inventory needs to inventory needs of other merchants that are in the same merchant category. For example, based on the inventory needs of other merchants that have the same merchant category as a particular merchant, the inventory server 110 can notify the particular merchant that similar merchants typically stock up on certain items during a particular time period or season. One example notification may state "merchants like you at this time of the year typically need 2,000 units of product X, 750 units of product Y, and 350 units of product Z."

In some embodiments, the inventory server 110 is configured to interact with a financing server 114 to also provide the merchant with financing opportunities when providing inventory recommendations. Thus, for example, when the merchant is sent a recommendation to replenish particular items, the inventory server 110 can also determine an estimated amount of funds that the merchant would need to restock these particular items. The inventory server 110 can then interact with the financing server 114 to determine whether the merchant would qualify for a cash advance in the amount of the estimated amount of funds needed to replenish the particular items. If the merchant qualifies, then the payment system 108 can offer the merchant a cash advance for the amount needed to purchase the particular items, as illustrated in the example view in FIG. 3. In some embodiments, if the merchant qualifies for an amount that is less than the amount needed to purchase the particular items, the payment system 108 can still provide the merchant with an offer for a cash advance in the lesser amount that the merchant is qualified to receive. Naturally, in some instances, the merchant may qualify for a cash advance that is higher than the amount that would be needed to replenish the particular items. In such instances, the merchant can be offered the entire qualified amount. In some embodiments, the merchant is pre-qualified for a cash advance of a particular amount. In such embodiments, the inventory server 110 can provide the merchant with an offer for a cash advance in the pre-qualified amount when sending inventory recommendations to the merchant.

The financing server 114 is configured to determine whether a merchant qualifies for a financing offer, e.g., a cash advance, by evaluating various factors associated with the merchant. Some of these factors can be based, in part, on evaluating financial transactions conducted by the merchant through the payment system 112.

The financing server 114 can determine whether a merchant is eligible for a financing offer, the amount of the cash advance, a fee for the cash advance, e.g., a percentage of the cash advance or a fixed fee, and a rate for repayment for the cash advance and the fee, i.e., a fixed amount or a percentage, to be deducted from financial transactions conducted by the merchant. These determinations can be made, for example, by applying various machine learning techniques, e.g., ensemble learning methods.

In various embodiments, the financial server 114 utilizes a classifier, for example, using a random forest approach, to determine whether a merchant qualifies for a financing offer. The classifier can be trained using training data that describes, for various merchants, respective payment history, the respective type of business, a respective gross payment volume (GPV) over a particular time period, the growth of the merchant's GPV over a particular time period, e.g., month over month growth, and whether the merchant has a brick-and-mortar store, to name some examples.

To determine whether a particular merchant qualifies for a financing offer, the financing server 114 can utilize the classifier to determine whether factors describing the merchant qualify the merchant for a cash advance. As mentioned, these factors can be, for example, the merchant's payment history, the type of business, and a GPV over a particular time period, e.g., over the past fiscal quarter or year. The financing server 114 can also determine the amount of the financing offer, the fee for the financing offer, and the rate of repayment, using similar techniques. For example, the financing server 114 can apply normal regression analysis on the merchant's previous financial transactions conducted by the merchant through the payment system 112 to make such determinations. In some embodiments, the fee for the cash advance is based on a specified percentage, e.g., 14 percent, of the cash advance. In some embodiments, the rate of repayment is a specified percentage, e.g., 10 percent. In some embodiments, the rate is determined based on targeting a 10-month repayment model. This model can be determined by forecasting the merchant's GPV for the subsequent year.

Once the financing server 114 determines that the merchant qualifies for a financing offer, the details of the financing offer can be sent to the merchant. Depending on the implementation, the offer details can be sent to the computing device over a network, e.g., the Internet, through a web-based environment, as described above, or may be sent to the merchant through electronic communication, e.g., by e-mail or a text message.

The merchant can then accept the financing offer, for example, by selecting an accept option, as described below. Once the offer is accepted, the financing server 114 can instruct the payment system 112 to disburse funds, to the merchant, in the amount specified in the offer. The payment system 112 can access various merchant data that describes financial account information, e.g., a routing number for a checking account, for the merchant. In some embodiments, the payment system 112 electronically deposits the funds in the merchant's financial account with a financial institution 118. The merchant can then access the funds directly from their financial account. Other approaches to providing the merchant with the cash advance are possible including, for example, providing the merchant with a financial payment card having a pre-set spending limit in the amount of the cash advance.

The payment system 112 is configured to process financial transactions between the merchant 102 and customers 105, as described below in reference to FIG. 5. In various embodiments, while processing financial transactions for the merchant 102, the payment system 112 is also configured to deduct a portion of the merchant's earnings from these financial transactions until the amount of financing provided to the merchant, together with the fee for the financing, is collected by the payment system 112. The amount deducted from financial transactions can be based on a rate for repayment for the cash advance and the fee, as specified in the terms and conditions, i.e., a fixed amount deducted from each transaction, e.g., $5, or a percentage, e.g., 10 percent, to be deducted from financial transactions conducted by the merchant. As mentioned, these deductions can be performed on a per-transaction basis or from financial transactions conducted by the merchant over a certain time period, e.g., hourly, daily, weekly, bi-weekly, monthly, or yearly.

In some embodiments, the financing server 114 may determine that the merchant qualifies up to a maximum amount of financing. In such embodiments, the merchant can request an amount of financing that is the same or less than the maximum amount of financing. In some embodiments, the merchant may request an amount of financing that is higher than the amount of financing that the merchant was pre-qualified to receive. In such embodiments, the financing server 114, alone or in combination with human feedback, can evaluate the request to determine whether the merchant should receive the requested higher amount of financing.

The financing server 114 is configured to evaluate respective factors associated with merchants, as described above, to determine whether any of those merchants pre-qualify for respective financing offers. Naturally, the factors for each merchant will vary based on the different types of financial transactions performed by that merchant and the various attributes of the merchant. Thus, the financing server 114 is able to generate custom financing offers for each merchant. Financing offers for each merchant can be determined automatically without merchants necessarily requesting such offers. Once determined, these offers can be provided to the merchants for replenishing their inventories, as described above, without the merchant having to request the cash advance.

Inventory management is just one example of how the approaches described in this specification can be applied. However, it should be understood that the techniques described herein are applicable to all manner of business expenses including, but not limited to, inventory-related expenses as well as business expenses, e.g., operating expenses, business needs, etc.

Figure 3:
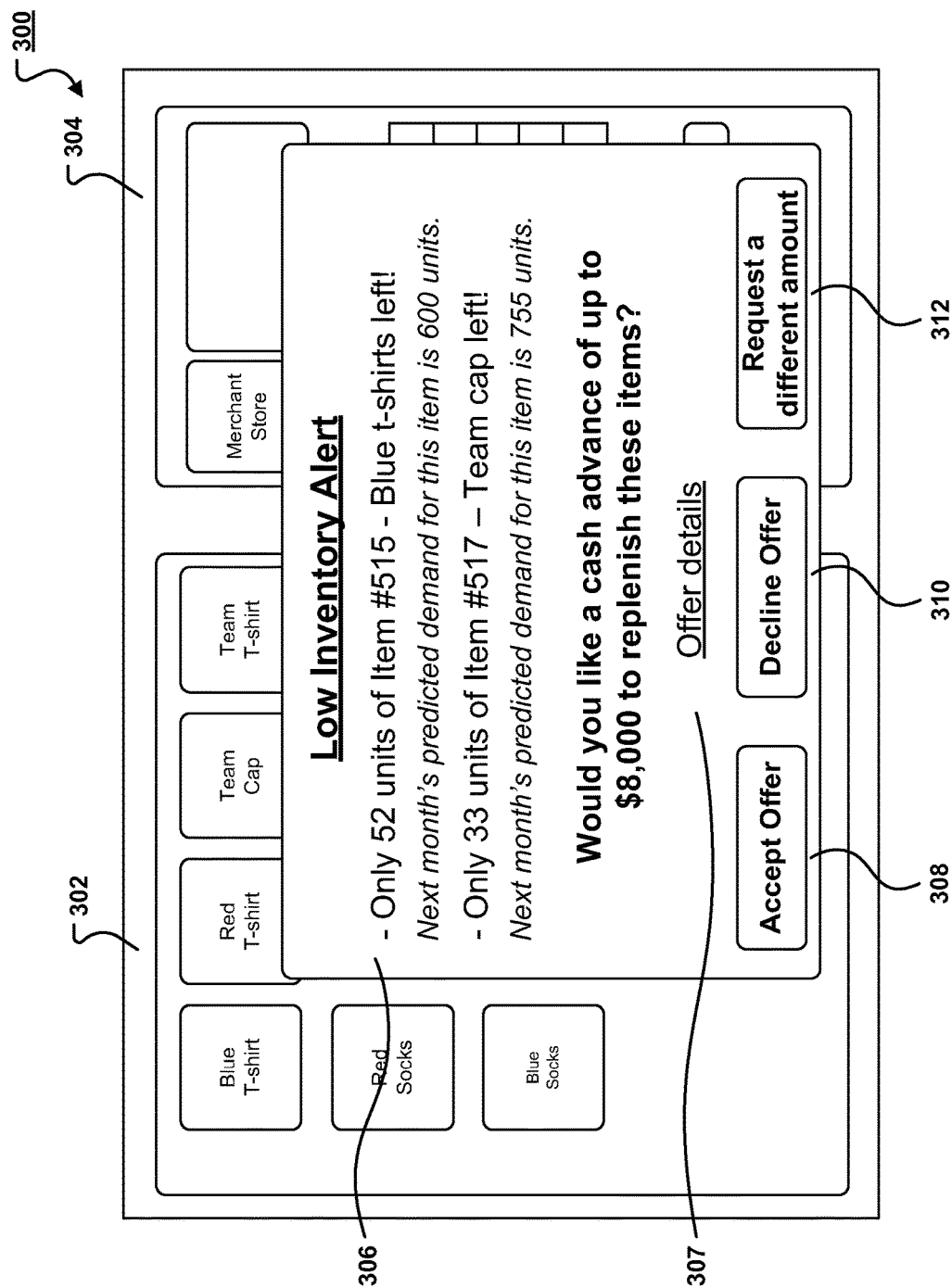
FIG. 3 illustrates an example view of a merchant point of sale register interface showing an inventory alert notification.

FIG. 3 illustrates an example view of a merchant point of sale register interface 300 showing an inventory alert notification 306. The interface 300 is a graphical user interface that can be displayed on a display screen of a merchant device and through a merchant application that is running on the merchant device. For example, the graphical user interface can be displayed on a display screen of the merchant device 104, as described in reference to FIG. 1, and through a merchant application that is running on the merchant device 104. The interface 300 may also be accessible to the merchant over the Internet and through a secure Uniform Resource Locator (URL).

The interface 300 can include a first region 302 and a second region 304. The first region 302 can include icons that can each reference a product that is available for purchase through the merchant. Each icon can include a corresponding name and cost of the product. The interface 300 may also be formatted using a merchant logo and a color motif specified by the merchant. The second region 304 can display an itemized listing of products being purchased by the customer, including, for each purchased product, a respective name, quantity being purchased, and cost.

The merchant can interact with the interface 300 to process financial transactions between the merchant and customers that are purchasing the merchant's products. These financial transactions can be processed through a payment system, e.g., the payment system 108, as described in reference to FIG. 1.

As described above, in addition to processing the merchant's financial transactions, the payment system can also be configured to manage the merchant's product inventory. For example, the payment system can notify the merchant, for example, through a pop-up notification 306, when items in the merchant's inventory are low in stock. The notification 306 can indicate a remaining quantity for the items, a name and/or description of the item, and a predicted demand for the item over a particular time period, e.g., over the next day, week, month, quarter, or year.

In some embodiments, the notification 306 also includes an offer for a cash advance. The offer for the cash advance can be determined by the payment system 108, as described in reference to FIG. 1. For example, when the merchant is sent a notification that particular items are in low supply, the notification can also include an offer for a cash advance for an amount that the merchant is pre-qualified to receive, as described above.

After receiving notification of the offer, the merchant can interact with the merchant device to obtain information about the offer details, for example, by selecting a link 307. The offer details can specify terms and conditions for the cash advance. These terms and conditions may specify that the merchant financing system will provide the merchant a cash advance of a particular sum and, in return, the merchant agrees to pay the merchant financing system a fee, e.g., a fixed fee. Details regarding the repayment of the fee can also be provided in the terms and conditions.

In some embodiments, this information includes a maximum amount of financing that the merchant is pre-qualified to receive. This amount can be determined based in part on evaluating the merchant's financial transactions that were processed through the payment system, as described above.

For example, the merchant financing system may determine that the merchant qualifies for a cash advance of up to $8,000. This information can be presented to the merchant through the notification 306. In some embodiments, the merchant can simply select the accept option 308 to receive the entire amount of financing that the merchant is pre-qualified to receive. In some embodiments, the amount of the cash advance is based on an amount the merchant needs to replenish certain inventory items that need restocking. For example, the payment system can determine that the merchant is pre-qualified for a $10,000 cash advance but that the merchant only needs $800 to replenish its inventory. In such instances, the offer for the cash advance can be for $800. Depending on the embodiment, if the merchant accepts the cash advance of $800, then the amount the merchant is pre-qualified to receive can be reduced to $9,200, which is $800 less than the $10,000 amount the merchant was pre-qualified to receive until the merchant repays the paid out cash advance.

In some instances, the merchant may not need the entire amount of financing being offered. Thus, in some embodiments, the merchant can request a specific amount of financing, e.g., $7,500, by selecting an option 312 to request the different amount. The payment system can evaluate various factors, e.g., the merchant's financial transaction history, to determine whether the merchant qualifies for the requested amount. If approved, the payment system can provide adjusted terms and conditions with adjusted repayment details to be presented in the interface 300, including, for example, the amount of fee to be charged for the requested cash advance, percentage to be deducted from the merchant's financial transactions for repayment of that fee, whether the deductions are done on a per-transaction basis or from financial transactions conducted by the merchant over a certain time period, e.g., hourly, daily, weekly, bi-weekly, monthly, or yearly. The adjusted terms may also specify a new time period for repayment may be specified in the terms and conditions.

If these adjusted terms and conditions, together with the repayment details, are agreeable to the merchant, then the merchant can select the accept option 308 button to accept the financing offer. In response, the payment system can deposit the requested amount in the merchant's account with a financial institution. Other approaches to providing the requested can also be used, as described in this specification. As described above, the payment system can instruct the payment system to deduct a portion of the merchant's earnings from future sales until the fee is repaid to the merchant financing system.

Figure 4:
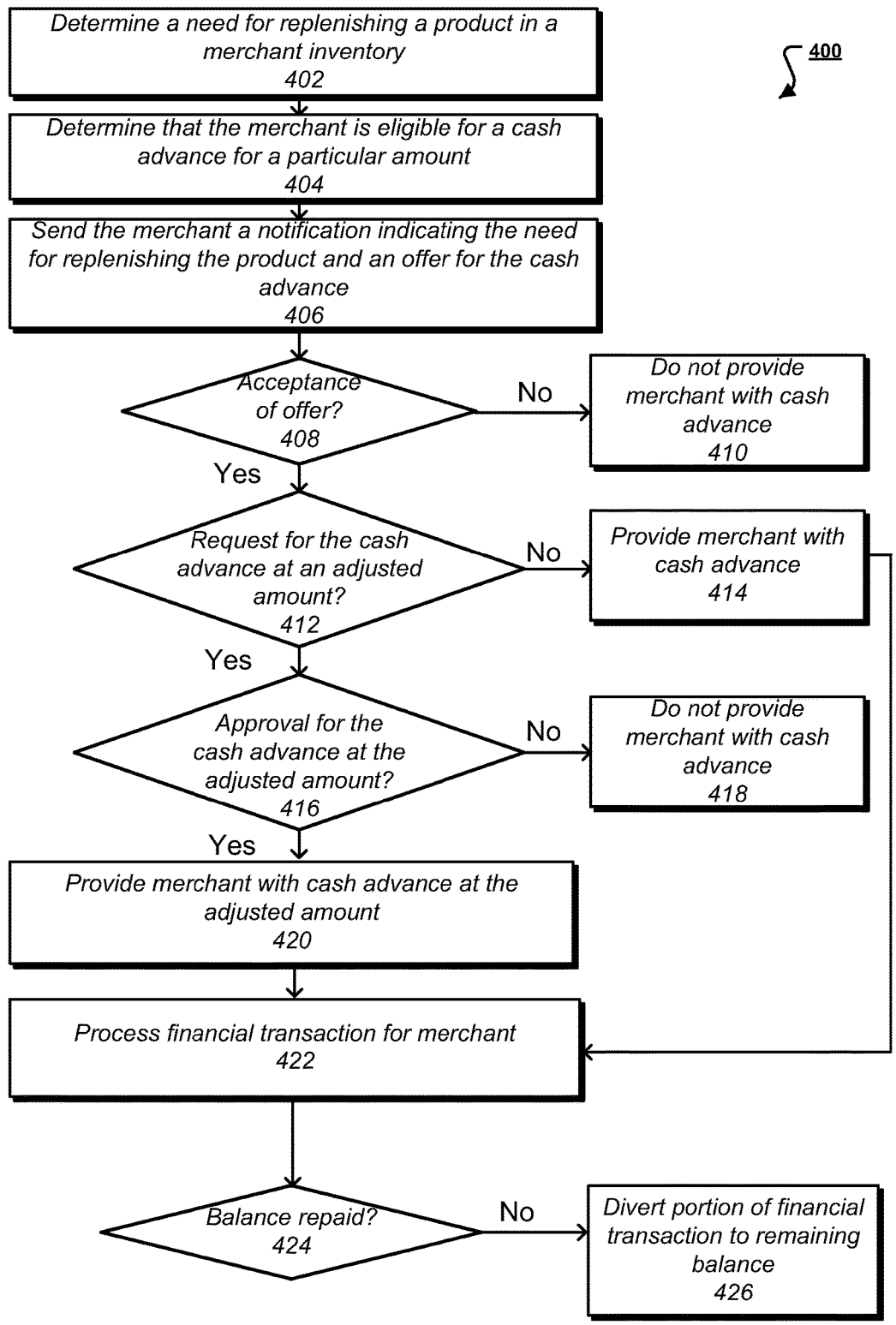
FIG. 4 illustrates an example process for providing inventory recommendations.

FIG. 4 illustrates an example process 400 for providing inventory recommendations. The example process 400 is provided merely as an example and additional or fewer steps may be performed in similar or alternative orders, or in parallel, within the scope of the various embodiments described in this specification. A computing system, e.g., the payment system 108, as described in reference to FIG. 1, determines that a merchant has a need for replenishing a product in the merchant's inventory 402. As described above, this need can be determined based on the merchant's inventory data, sales data, or a combination thereof. The computing device can determine that a merchant is eligible for a cash advance for a particular amount, as described above 404. The computing system can provide the merchant with a notification indicating that there is need for replenishing the product and with an offer for the cash advance for the particular amount, as described above 406.

The merchant can accept or reject the offer for the cash advance, as described above 408. If the merchant rejects the offer, then the computing system does not provide the merchant with the cash advance in the particular amount 410. However, if the merchant accepts the offer, a determination can be made whether the merchant is requesting the cash advance at a different amount than the offered particular amount 412. If the merchant has accepted the offer for the cash advance at the particular amount, then the computing system can provide the merchant with the cash advance 414. The merchant can then start processing financial transactions through the merchant financing system 422, as described below.

However, if the merchant is requesting the cash advance at an adjusted amount, for example, a higher amount or a lesser amount, then a determination can be made if providing the cash advance at the adjusted amount is approved 416. If the computing system determines that providing the merchant with the cash advance at the adjusted amount is not approved, then the computing system does not provide the merchant with the cash advance 418. In such instances, the computing system can provide the merchant with a message indicating that a cash advance at the requested amount is not approved. If, however, the computing system determines that providing the merchant with the cash advance at the adjusted amount is approved, then the computing system provides the merchant with the cash advance 420.

After receiving the cash advance, the merchant can process financial transactions through the merchant financing system 422. When processing a financial transaction, the merchant financing system can determine whether the merchant still needs to repay the remaining balance for the cash advance and fee 424. If the balance still needs to be repaid, then a portion of funds are diverted from the financial transaction to the merchant financing system 426. The amount of the portion of funds can be determined based on the rate for repayment for the cash advance and the fee. If the merchant has already repaid the remaining balance for cash advance and the fee, then no funds are diverted and the merchant can continue processing financial transactions normally 422.

Figure 5:
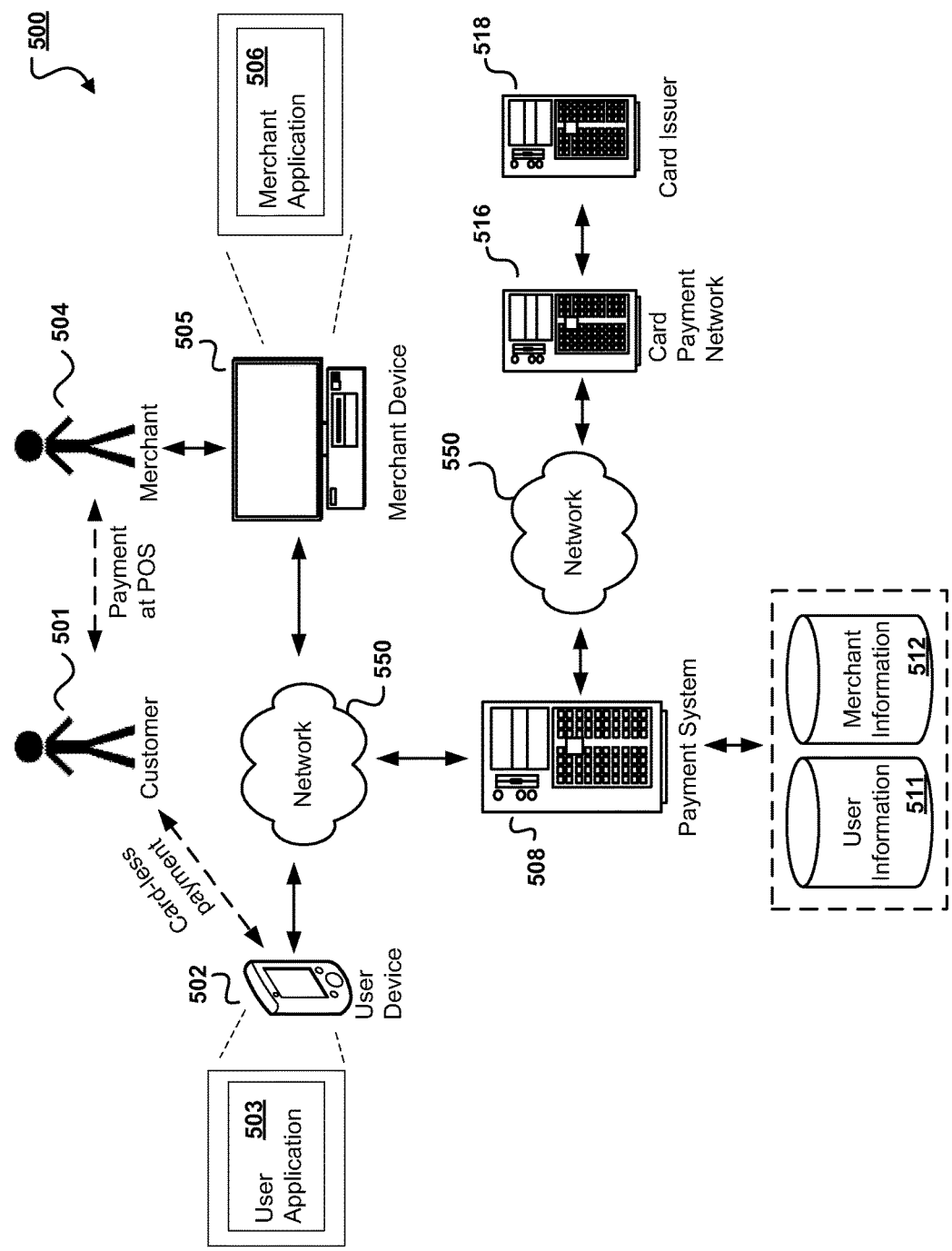
FIG. 5 illustrates an example of an environment for implementing a payment system.

FIG. 5 illustrates an example of an environment 500 for implementing a payment system 508. Although a mobile device environment is described for purposes of explanation, different environments may be used, e.g., a web-based environment, to implement various embodiments.

The example environment 500 includes a payment system 508, e.g., the payment system 108, as described above, which can be implemented as computer programs on one or more computers in one or more locations, in which the systems, components, and techniques described below can be implemented. The example environment 500 also includes a user device 502 and a merchant device 505.

The user device 502 and the merchant device 505 can each be a computer coupled to the payment system 508 through a data communication network 550, e.g., the Internet. The user device 502 and the merchant device 505 each generally include a memory, e.g., a random access memory (RAM), for storing instructions and data, and a processor for executing stored instructions. The user device 502 and the merchant device 505 can each include one or more components, e.g., software or hardware, that are configured to respectively determine a geographic location of the user device 502 or the merchant device 505, using, for example, various geolocation techniques, e.g., a global positioning system (GPS). Further, the user device 502 and the merchant device 505 can each be any appropriate device operable to send and receive requests, messages, or other types of information over the network 550. Some examples of user devices include personal computers, cellular phones, hand-held messaging devices, laptop computers, personal data assistants, tablet devices, and the like.

The network 550 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system 508, the merchant device 505, and the user device 502 can communicate over the network using wired or wireless connections, and combinations thereof.

As used in this specification, a financial transaction is a transaction that is conducted between a customer 501 and a merchant 504 at a point-of-sale. When paying for a financial transaction, the customer 501 can provide the merchant 504 with cash, a check, or credit card for the amount that is due. The merchant 504 can interact with a point-of-sale device, e.g., merchant device 505, to process the financial transaction. During financial transactions, the point-of-sale device can collect data describing the financial transaction, including, for example, the amount of payment received from customers.

In some implementations, the payment system 508 is configured to accept card-less payment transactions from customers, e.g., the customer 501. As used in this specification, a card-less payment transaction is a transaction conducted between the customer 501 and a merchant 504 at the point-of-sale during which a financial account of the customer 501 is charged without the customer 501 having to physically present a financial payment card to the merchant 504 at the point-of-sale. That is, the merchant 504 need not receive any details about the financial account, e.g., the credit card issuer or credit card number, for the transaction to be processed.

Before conducting card-less payment transactions, the customer 501 typically creates a user account with the payment system 508. The customer 501 can create the user account, for example, by interacting with a user application 503 that is configured to perform card-less payment transactions and that is running on the user device 502. When creating a user account with the payment system 508, the customer 501 will provide portrait of the customer 501, data describing a financial account of the customer 501, e.g., credit card number, expiration date, and a billing address. This user information can be securely stored by the payment system 508, for example, in a user information database 511. To accept card-less payment transactions, the merchant 504 typically creates a merchant account with the payment system 508 by providing information describing the merchant including, for example, a merchant name, contact information, e.g., telephone numbers, the merchant's geographic location address, and one or more financial accounts to which funds collected from users will be deposited. This merchant information can be securely stored by the payment system 508, for example, in a merchant information database 512.

The payment system 508 is configured to perform card-less payment transactions. The payment system 508 can include one or more servers that are configured to securely perform electronic financial transactions, e.g., electronic payment transactions, between a customer and a merchant, for example, through data communicated between the user device 502 and the merchant device 505. Generally, when a customer and a merchant enter into an electronic financial transaction, the transaction is processed by transferring funds from a financial account associated with the user account to a financial account associated with the merchant account.

The payment system 508 is configured to send and receive data to and from the user device 502 and the merchant device 505. For example, the payment system 508 can be configured to send data describing merchants to the user device 502 using, for example, the information stored in the merchant information database 512. For example, the payment system 508 can communicate data describing merchants that are within a threshold geographic distance from a geographic location of the user device 502, as described in this specification. The data describing merchants can include, for example, a merchant name, geographic location, contact information, and an electronic catalogue, e.g., a menu, that describes items that are available for purchase from the merchant.

In some embodiments, the payment system 508 is configured to determine whether a geographic location of the user device 502 is within a threshold geographic distance from a geographic location of the merchant device 505. The payment system 508 can determine a geographic location of the user device 502 using, for example, geolocation data provided by the user device 502. Similarly, the payment system 508 can determine a geographic location of the merchant device 505 using, for example, geolocation data provided by the merchant device 505 or using a geographic address, e.g., street address, provided by the merchant. Depending on the implementation, the threshold geographic distance can be specified by the payment system 508 or by the merchant.

Determining whether the user device 502 is within a threshold geographic distance of the merchant device 505 can be accomplished in different ways including, for example, determining whether the user device 502 is within a threshold geographic radius of the merchant device 505, determining whether the user device 502 is within a particular geofence, or determining whether the user device 502 can communicate with the merchant device 505 using a specified wireless technology, e.g., Bluetooth or Bluetooth low energy (BLE). In some embodiments, the payment system 508 restricts card-less payment transactions between the customer 501 and the merchant 504 to situations where the geographic location of the user device 502 is within a threshold geographic distance from a geographic location of the merchant device 505.

The payment system 508 can also be configured to communicate with a computer system 516 of a card payment network, e.g., Visa or MasterCard, over the network 550, or over a different network, for example, to conduct electronic financial transactions. The computer system 516 of the card payment network can communicate with a computer system 518 of a card issuer, e.g., a bank. There may be computer systems of other entities, e.g., the card acquirer, between the payment system 508 and the computer system 518 of the card issuer.

The customer 501 operating the user device 502 that is within a threshold geographic distance of the merchant 504 can interact with a user application 503 running on the user device 502 to conduct a card-less payment transaction with the merchant 504. While interacting with the user application 503, the customer 501 can select the merchant 504, from a listing of merchants, with whom the customer 501 wants to enter into a card-less payment transaction. The user can select the merchant 504, for example, by selecting a "check in" option associated with the merchant 504. The user device 502 can communicate data to the payment system 508 indicating that the customer 501 has checked in with the merchant 504. In response, the payment system 508 can communicate data to notify the merchant device 505 that the user has checked in. A merchant application 506 running on the merchant device 505 can notify the merchant 504 that the user has electronically checked in with the merchant 504 through a display screen of the merchant device 505.

Once checked in, the customer 501 can collect, or request, items that are available for purchase from the merchant 504. When the customer 501 is ready to enter into the card-less payment transaction, the customer 501 can, for example, approach a point-of-sale for the merchant 504 and identify him or herself. For example, the customer 501 can verbally notify the merchant 504 that the customer 501 wants to enter into a card-less payment transaction and can provide the merchant 504 with the customer's name. The merchant 504 can then interact with the merchant application 506 to select the customer 501, from a listing of customers that have checked in with the merchant 504, to initiate a card-less payment transaction for the items being purchased by the customer 501. For example, the merchant 504 can determine a total amount to bill the customer 501 for the items being purchased. The customer 501 can verbally approve the total amount to be billed and, in response, the merchant 504 can submit a request for a card-less payment transaction for the total amount to the payment system 508. In response, the payment system 508 can obtain, for example, from the user information database 511, data describing a financial account associated with a user account of the customer 501 to which the total amount will be billed.

The payment system 508 can then communicate with the computer system 516 of a card payment network to complete an electronic financial transaction for the total amount to be billed to the customer's financial account. Once the electronic financial transaction is complete, the payment system 508 can communicate data describing the card-less payment transaction to the user device 502, e.g., an electronic receipt, which can, for example, notify the customer 501 of the total amount billed to the user for the card-less payment transaction with the particular merchant.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data, which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A computer-implemented method comprising:
receiving, by one or more processors of a payment system, from a point-of-sale (POS) computing device of a merchant, transaction data for a plurality of financial transactions corresponding to purchases by a plurality of customers of a plurality of first items from an inventory of the merchant, the transaction data including payment data and an indication of the first items and other items purchased for the financial transactions;
determining, by the one or more processors, a quantity of the first item for the merchant to purchase to replenish the inventory;
determining, by the one or more processors, based at least partially on the transaction data received from the POS computing device, a financing amount for enabling the merchant to purchase at least a portion of the quantity of the first item for replenishing the first item in the inventory;

sending, by the one or more processors, a notification to the POS computing device of the merchant that causes a merchant application on the POS computing device to display an inventory interface concurrently with a transaction interface, the inventory interface presenting a message indicating the quantity of the first item for replenishing the inventory and further presenting an offer for the financing amount, wherein the transaction interface on the POS computing device is used to conduct the financial transactions between the merchant and the customers of the merchant;

receiving, by the one or more processors, via the inventory interface presented on the POS computing device, an acceptance of the offer for the financing amount from the POS computing device of the merchant; and providing, by the one or more processors, the financing amount to a financial account of the merchant.

2. The computer-implemented method as recited in claim 1, wherein the transaction data indicates, for a respective first financial transaction, a respective quantity of the first item that was purchased during the respective first financial transaction, the method further comprising:

maintaining, by the one or more processors, based on the received transaction data, a data structure of the inventory of the merchant, the data structure including information about items available for purchase from the merchant, including a quantity of the first item remaining in the inventory of the merchant; and in response to receiving the transaction data for the respective first financial transaction, updating in the data structure, by the one or more processors, the quantity of the first item maintained in the inventory based on the respective quantity of the first item that was purchased during the individual first financial transaction.

3. The computer-implemented method as recited in claim 2, wherein determining a quantity of the first item for the merchant to purchase to replenish the inventory further comprises:

determining, from the data structure, a historical quantity of the first item sold during a prior time period corresponding to an upcoming time period determining, at least partially from the data structure, based at least partially on the historical quantity for a prior time period, a quantity for satisfying demand for the first item during the upcoming time period; and determining, based on a current quantity of the first item in the inventory indicated by the data structure, that the current quantity of the first item in the inventory does not meet the quantity to satisfy the demand.

4. The computer-implemented method as recited in claim 1, further comprising:

receiving, by the one or more processors, transaction data from a plurality of other merchants, wherein at least some of the other merchants are in a same merchant category as the merchant, wherein determining the quantity of the first item for the merchant to purchase to replenish the inventory further comprises determining the quantity of the first item for the merchant to purchase based in part on determining, for the upcoming time period, a quantity of the first item sold by the other merchants that are in a same merchant category as the merchant.

5. The computer-implemented method as recited in claim 1, further comprising utilizing one or more application programming interfaces (APIs) to access one or more social media resources to obtain social media data that describes a popularity of the merchant;

determining, based on the obtained social media data indicating that the merchant is gaining popularity, that the merchant will be receiving more customers; and determining the quantity of the first item for the merchant to purchase to replenish the inventory based at least in part on the social media data accessed via the API.

6. A computer-implemented method comprising:

receiving, by a payment system, from a point-of-sale (POS) computing device of a merchant, transaction data for a plurality of financial transactions corresponding to purchases by a plurality of customers of a plurality of first items from an inventory of the merchant;

determining, by the payment system, based at least partially on the transaction data received from the POS computing device, a quantity of the first item for the merchant to purchase to replenish the inventory;

determining, by the payment system, based at least partially on the transaction data received from the POS computing device, a financing amount to enable the merchant to purchase at least a portion of the quantity of the first item for replenishing the first item in the inventory;

sending, by the payment system, a notification to the POS computing device of the merchant that causes a merchant application on the POS computing device to display an inventory interface concurrently with a transaction interface, the inventory interface presenting a message indicating the quantity of the first item for replenishing the inventory and further presenting an offer for the financing amount, wherein the transaction interface on the POS computing device is used to conduct the financial transactions between the merchant and the customers of the merchant;

receiving, by the payment system, via the inventory interface presented on the POS computing device, an acceptance of the offer for the financing; and providing, by the payment system, the financing amount to a financial account of the merchant.

7. The computer-implemented method as recited in claim 6, wherein the transaction data indicates, for a respective first financial transaction, a respective quantity of the first item that was purchased during the respective first financial transaction, the method further comprising:

maintaining, by the one or more processors, based on the received transaction data, a data structure of the inventory of the merchant, the data structure including information about items available for purchase from the merchant, including a quantity of the first item remaining in the inventory of the merchant; and in response to receiving the transaction data for the respective first financial transaction, updating in the data structure, by the one or more processors, the quantity of the first item maintained in the inventory based on the respective quantity of the first item that was purchased during the individual first financial transaction.

8. The computer-implemented method as recited in claim 7, wherein determining the quantity of the first item for the merchant to purchase to replenish the inventory further comprises:

determining, from the data structure, a historical quantity of the first item sold during a prior time period corresponding to an upcoming time period determining, at least partially from the data structure, based at least partially on the historical quantity for a prior time period, a quantity for satisfying demand for the first item during the upcoming time period; and determining, based on a current quantity of the first item in the inventory indicated by the data structure, that the current quantity of the first item in the inventory does not meet the quantity to satisfy the demand.

9. The computer-implemented method as recited in claim 6, further comprising:

receiving, by the one or more processors, transaction data from a plurality of other merchants, wherein at least some of the other merchants are in a same merchant category as the merchant, wherein determining the quantity of the first item for the merchant to purchase to replenish the inventory further comprises determining the quantity of the first item for the merchant to purchase based in part on determining, for the upcoming time period, a quantity of the first item sold by the other merchants that are in a same merchant category as the merchant.

10. The computer-implemented method as recited in claim 6, further comprising:

utilizing one or more application programming interfaces (APIs) to access one or more social media resources to obtain social media data that describes a popularity of the merchant;

determining, based on the obtained social media data indicating that the merchant is gaining popularity, that the merchant will be receiving more customers; and determining the quantity of the first item for the merchant to purchase to replenish the inventory based at least in part on the social media data accessed via the one or more APIs.

11. The computer-implemented method as recited in claim 10, wherein the social media data obtained using the one or more APIs from the one or more social media resources describing the popularity of the merchant includes one or more of:

data describing a number of check-ins at the merchant's location, a number of reviews for the merchant, an average review rating for the merchant, or a number of entities that have identified the merchant as a favorite.

12. The computer-implemented method as recited in claim 6, wherein:

the inventory interface displayed by the merchant application on the POS computing device includes at least one control to enable the merchant to accept the financing; and the transaction interface displayed by the merchant application on the POS computing device is used to conduct the plurality of financial transactions between the merchant and the plurality of customers.

13. The computer-implemented method as recited in claim 6, further comprising:

processing at least one subsequent financial transaction conducted between the merchant and at least one customer of the merchant using the POS computing device of the merchant;

determining that the merchant has not repaid the financing; and apportioning a respective portion of funds from the at least one subsequent financial transaction to a separate financial account of the payment system.

14. A system comprising:
one or more processors;
a non-transitory computer-readable media storing instructions which, when executed by the one or more processors, program the one or more processors to perform operations comprising:

receiving, from a point-of-sale (POS) computing device of a merchant, transaction data for a plurality of financial transactions corresponding to purchases by a plurality of customers of a plurality of first items from an inventory of the merchant;

determining, based at least partially on the transaction data received from the POS computing device, a quantity of the first item for the merchant to purchase to replenish the inventory;

determining, based at least partially on the transaction data received from the POS computing device, a financing amount to enable the merchant to purchase at least a portion of the quantity of the first item for replenishing the first item in the inventory;

sending, a notification to the POS computing device of the merchant that causes a merchant application on the POS computing device to display an inventory interface concurrently with a transaction interface, the inventory interface presenting a message indicating the quantity of the first item for replenishing the inventory and further presenting an offer for the financing amount, wherein the transaction interface on the POS computing device is used to conduct the financial transactions between the merchant and the customers of the merchant;

receiving, via the inventory interface presented on the POS computing device, an acceptance of the offer for the financing amount; and providing the financing amount to a financial account of the merchant.

15. The system as recited in claim 14, wherein the transaction data indicates, for a respective first financial transaction, a respective quantity of the first item that was purchased during the respective first financial transaction, the operations further comprising:

maintaining, based on the received transaction data, a data structure of the inventory of the merchant, the data structure including information about items available for purchase from the merchant, including a quantity of the first item remaining in the inventory of the merchant; and in response to receiving the transaction data for the respective first financial transaction, updating in the data structure, the quantity of the first item maintained in the inventory based on the respective quantity of the first item that was purchased during the individual first financial transaction.

16. The system as recited in claim 15, wherein the operation of determining the quantity of the first item for the merchant to purchase to replenish the inventory further comprises:

determining, from the data structure, a historical quantity of the first item sold during a prior time period corresponding to an upcoming time period determining, at least partially from the data structure, based at least partially on the historical quantity for a prior time period, a quantity for satisfying demand for the first item during the upcoming time period; and determining, based on a current quantity of the first item in the inventory indicated by the data structure, that the current quantity of the first item in the inventory does not meet the quantity to satisfy the demand.

17. The system as recited in claim 14, the operations further comprising:
receiving transaction data from a plurality of other merchants, wherein at least some of the other merchants are in a same merchant category as the merchant,
wherein determining the quantity of the first item for the merchant to purchase to replenish the inventory further comprises determining the quantity of the first item for the merchant to purchase based in part on determining, for the upcoming time period, a quantity of the first item sold by the other merchants that are in a same merchant category as the merchant.

18. The system as recited in claim 14, the operations further comprising:
utilizing one or more application programming interfaces (APIs) to access one or more social media resources to obtain social media data that describes a popularity of the merchant;
determining, based on the obtained social media data indicating that the merchant is gaining popularity, that the merchant will be receiving more customers; and
determining the quantity of the first item for the merchant to purchase to replenish the inventory based at least in part on the social media data accessed via the one or more APIs.

19. The system as recited in claim 18, wherein the social media data obtained using the one or more APIs from the one or more social media resources describing the popularity of the merchant includes one or more of: data describing a number of check-ins at the merchant's location, a number of reviews for the merchant, an average review rating for the merchant, or a number of entities that have identified the merchant as a favorite.

20. The system as recited in claim 14, wherein:
the inventory interface displayed by the merchant application on the POS computing device includes at least one control to enable the merchant to accept the financing; and
the transaction interface displayed by the merchant application on the POS computing device is used to conduct the plurality of financial transactions between the merchant and the plurality of customers.

* * * * *